March 23, 1965   R. E. BENDL   3,174,790
HELICOPTER CARGO HOOK AND RELEASE SYSTEM
Filed April 6, 1962   8 Sheets-Sheet 1

INVENTOR.
ROBERT E. BENDL
BY
ATTORNEY

March 23, 1965   R. E. BENDL   3,174,790
HELICOPTER CARGO HOOK AND RELEASE SYSTEM
Filed April 6, 1962   8 Sheets-Sheet 2

INVENTOR.
ROBERT E. BENDL
BY
ATTORNEY

March 23, 1965  R. E. BENDL  3,174,790
HELICOPTER CARGO HOOK AND RELEASE SYSTEM
Filed April 6, 1962  8 Sheets-Sheet 4

*INVENTOR.*
ROBERT E. BENDL
BY
*George F. Waterman*
ATTORNEY

March 23, 1965   R. E. BENDL   3,174,790
HELICOPTER CARGO HOOK AND RELEASE SYSTEM
Filed April 6, 1962   8 Sheets-Sheet 5

INVENTOR.
ROBERT E. BENDL
BY
ATTORNEY

March 23, 1965 R. E. BENDL 3,174,790
HELICOPTER CARGO HOOK AND RELEASE SYSTEM
Filed April 6, 1962 8 Sheets-Sheet 6

INVENTOR.
ROBERT E. BENDL
BY
ATTORNEY

March 23, 1965 R. E. BENDL 3,174,790
HELICOPTER CARGO HOOK AND RELEASE SYSTEM
Filed April 6, 1962 8 Sheets-Sheet 7

INVENTOR.
ROBERT E. BENDL
BY
ATTORNEY

March 23, 1965 R. E. BENDL 3,174,790
HELICOPTER CARGO HOOK AND RELEASE SYSTEM
Filed April 6, 1962 8 Sheets-Sheet 8

Fig. 22

START & STOP POSITION

Fig. 23

UPWARD RELEASE MOVEMENT

Fig. 24

REVERSING & RETURN MOVEMENT

INVENTOR.
ROBERT E. BENDL
BY
ATTORNEY

United States Patent Office 3,174,790
Patented Mar. 23, 1965

3,174,790
HELICOPTER CARGO HOOK AND RELEASE
SYSTEM
Robert E. Bendl, Grafton, Va.
Filed Apr. 6, 1962, Ser. No. 185,737
10 Claims. (Cl. 294—83)
(Granted under Title 35, U.S. Code (1952), sec. 266)

The invention described herein may be manufactured and used by or for the Government for governmental purposes without the payment to me of any royalty thereon.

The present invention relates to the field of cargo hooks, more particularly to the field of cargo hooks designed to carry an external load suspended beneath a helicopter and to systems for releasing loads from such hooks.

Helicopter transported loads are often carried suspended beneath the aircraft in the form of air transportable cargo packages each held together by a suitable harness having a hook engaging loop or target ring. To pick up a cargo package with an open throat hook assembly of the kind herein illustrated and described, it is necessary only to fly the projecting end of the hook beam into a loop or target ring secured to the harness of the cargo package. The loop or ring slides along the beak portion of the hook beam past the guard and comes to rest near the pivotal connection between the hook beam and the hook frame. The package may then be lifted and carried. No ground personnel are required for this operation. Usually such a load must be picked up and set down while the helicopter hovers near the ground. It is desirable, and this is particularly true in military combat operations, for the load to be picked up and landed without the assistance of any personnel on the ground. To accomplish this a releasable open throat cargo hook under the control of the pilot or a member of the helicopter crew is often provided as part of the system by which the load is carried. To facilitate the unloading operation and particularly to avoid dropping cargo packages even short distances, it has been suggested that means be provided which open the cargo hook automatically when the load contacts the ground or is touched down. The advantages of being able to discharge a suspended load in either of these ways are manifest. The load is discharged quickly with a minimum of danger to the helicopter and its crew from enemy fire. The risk of casualty to ground personnel is likewise reduced. Even apart from danger to personnel and material, the resulting speed of unloading makes for tactical efficiency.

A primary object of this invention is to provide an improved releasable cargo hook assembly to be used in carrying a load suspended beneath a helicopter.

A further object of this invention is to provide a motor driven release mechanism for actuating such a cargo hook.

Another object of this invention is to provide a system manually or electrically operated by a helicopter pilot for releasing a suspended load after it is set down on the ground.

Another object of this invention is to provide a system, conditioned in flight by the helicopter pilot, which automatically releases a suspended load when it contacts the ground.

These and other objects of the invention will appear from the attached drawings and the description which follows.

Figures 1, 2:
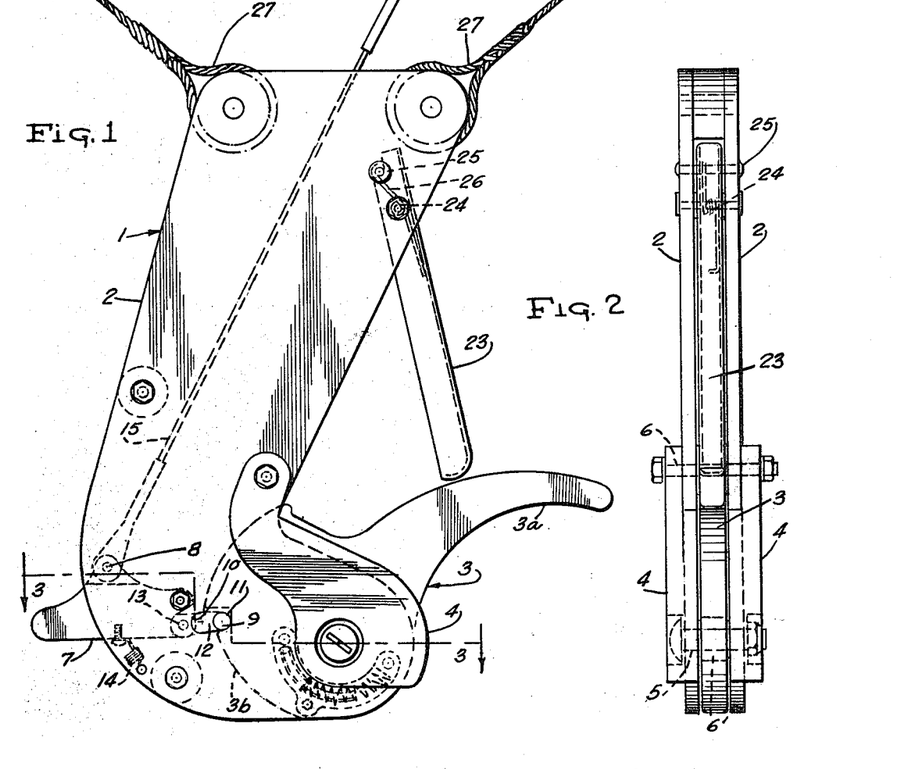
FIG. 1 is a side elevation of one form of helicopter cargo hook in a closed or latched condition.
FIG. 2 is a front elevation of the helicopter cargo hook of FIG. 1.
Figure 3:
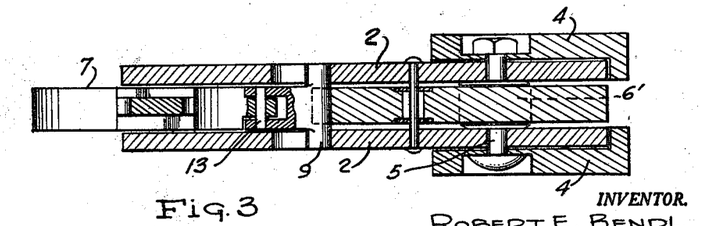
FIG. 3 is an enlarged sectional view taken along line 3—3 of FIG. 1.
Figures 4, 5, 6, 7, 8:
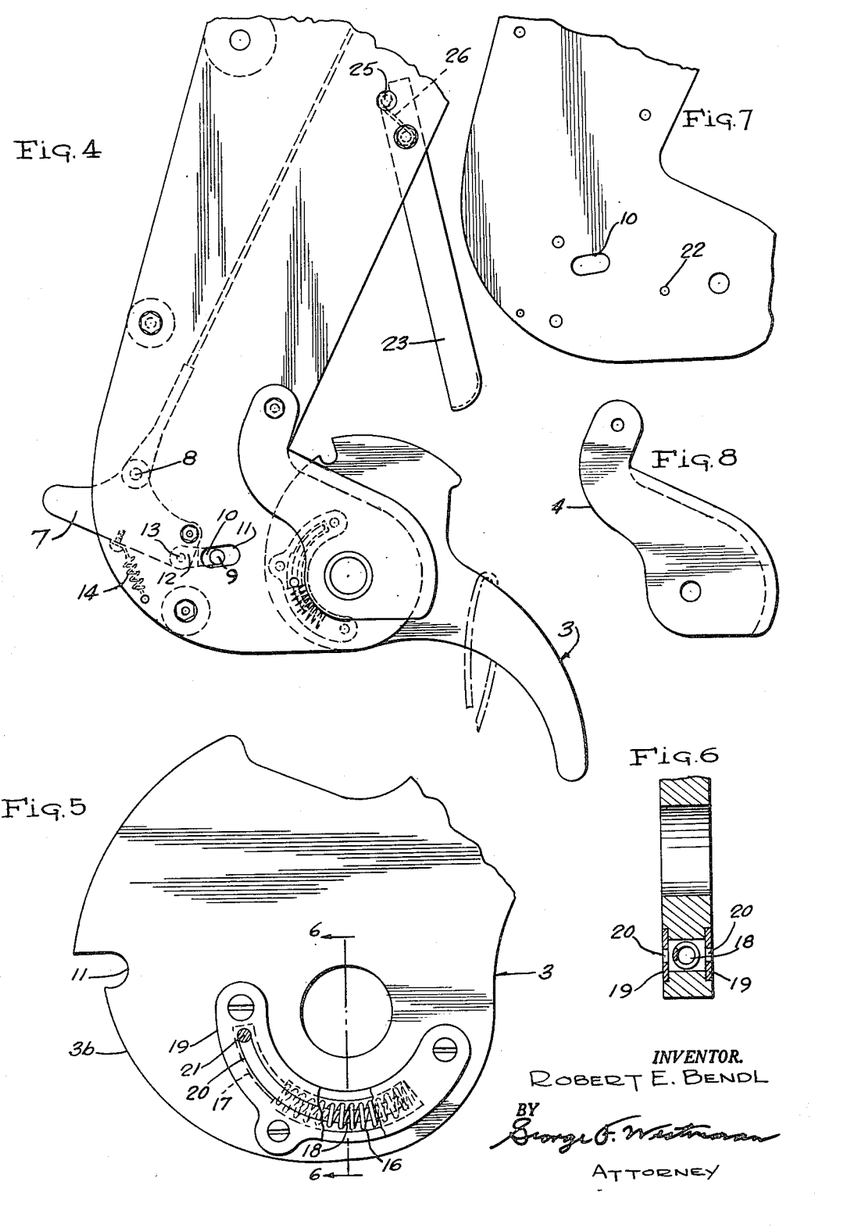
FIG. 4 is a side elevation of the helicopter cargo hook of FIG. 1 in an unlatched condition showing the tongue open as when the load is being discharged.
FIG. 5 is an enlarged view of part of the tongue member of the hook of FIG. 1.
FIG. 6 is a sectional view of the tongue member taken along line 6—6 of FIG. 5.
FIG. 7 is a side elevation of part of one of the shank plates of the cargo hook of FIG. 1.
FIG. 8 is a side elevation of one of the shelf plates of the cargo hook of FIG. 1.

Referring to FIGS. 1–8, the open throat helicopter cargo hook illustrated therein comprises a frame or shank portion shown generally by 1 formed of two parallel and spaced apart flat plates 2. A tongue member or hook beam 3, having a tongue or beak 3a and a curved surface 3b is pivotally mounted on the frame at the lower end of the frame. A pair of shaped shelves 4 are fastened to the outside surfaces of shank plates 2 at the lower end of the shank plates by pin 5 and bolt 6. These shelves provide a broad smooth supporting surface for the cargo ring which secures the load. Pin 5 constitutes at least a portion of the pivotal mounting which secures the hook beam to the frame. Bearings 6' are provided so that the tongue member may move angularly without material friction about the pivotal connection between its load supporting and load releasing positions as shown in FIGURES 1 and 4.

A latching lever 7 is disposed between the shank or frame plates 2 at the lower end of frame 1 and is pivotally mounted at its inner end on a pivot pin 8. Latching pin 9 extends through, and is slidable within, slots 10 in each of the shank plates 2. When the cargo hook is in its closed, i.e., latched, position shown in FIG. 1, latching pin 9 is seated in latching notch 11 cut into the back face of hook beam 3. Latching pin 9 is connected to latching lever 7 by link 12. The connection is made by pin 13 which permits relative rotation between the link and latching lever. Latching pin 9 is held in latching notch 11, and thus maintains the tongue member in a latched or closed position, by the downward pull of tension spring 14 on latching lever 7. The latching pin is removed from latching notch 11 by an upward pull on cable 15 which causes latching lever 7 to rotate in a clockwise direction (as seen in FIG. 1) around pivot pin 8.

Tongue member 3 is made with an arcuate slot 16 which receives spring 18. Slot covers 19 which themselves have a second arcuate slot 20 are fastened to each side of tongue member 3. Pin 21 passes through the first and second arcuate slots 16 and 20 and through holes 22 suitably located in each shank plate 2.

Keeper or guard 23 is pivotally mounted between shank plates 2 by pin 24; the rotation of the keeper in a counterclockwise direction (as seen in FIG. 1) is limited by stop pin 25. The keeper is resiliently urged to the position shown in FIG. 1 by torsion spring 26.

Sling means 27 are provided for attaching the cargo hook to the helicopter.

In employing the helicopter cargo hook, the hook assembly is suspended beneath the helicopter by sling means 27. Cable 15 is extended into the craft where it may be pulled by the pilot or a crew member. The hook is put in a latched condition as shown in FIG. 1, latching pin 9 engaging latching notch 11. The cargo is held in a harness which terminates in a loop or cargo ring. The loop or cargo ring is slipped over the end of tongue 3a and past keeper 23 which first moves inward to permit the passage of the cargo ring and thereafter snaps outward to the position shown in FIG. 1. The load is then ready to be transported. During flight the keeper 23 prevents the cargo ring from sliding off tongue 3a. When the helicopter reaches its destination and the load contacts the ground, the pilot pulls on cable 15 causing latching pin 9 to be withdrawn from latching notch 11. The tongue member 3 is then free to rotate under the weight of the load to the open position shown in FIG. 4. It should be noted that the tongue member is so formed that a line drawn from the point where the top of the cargo ring contacts the tongue member 3 to the center of gravity of the load passes just outside (to the right as shown in FIG. 1) of the axis about which the tongue member rotates. Normally it will rotate freely to the position shown in FIG. 4 and the cargo ring will slide off. Spring 18 will be compressed against pin 21. When the cargo ring has fallen away the compressed spring will urge the tongue member back to the closed position of FIG. 1, the curved surface 3b sliding smoothly past latching pin 9 until the pin falls into latching notch 11.

Figures 9, 10, 11:
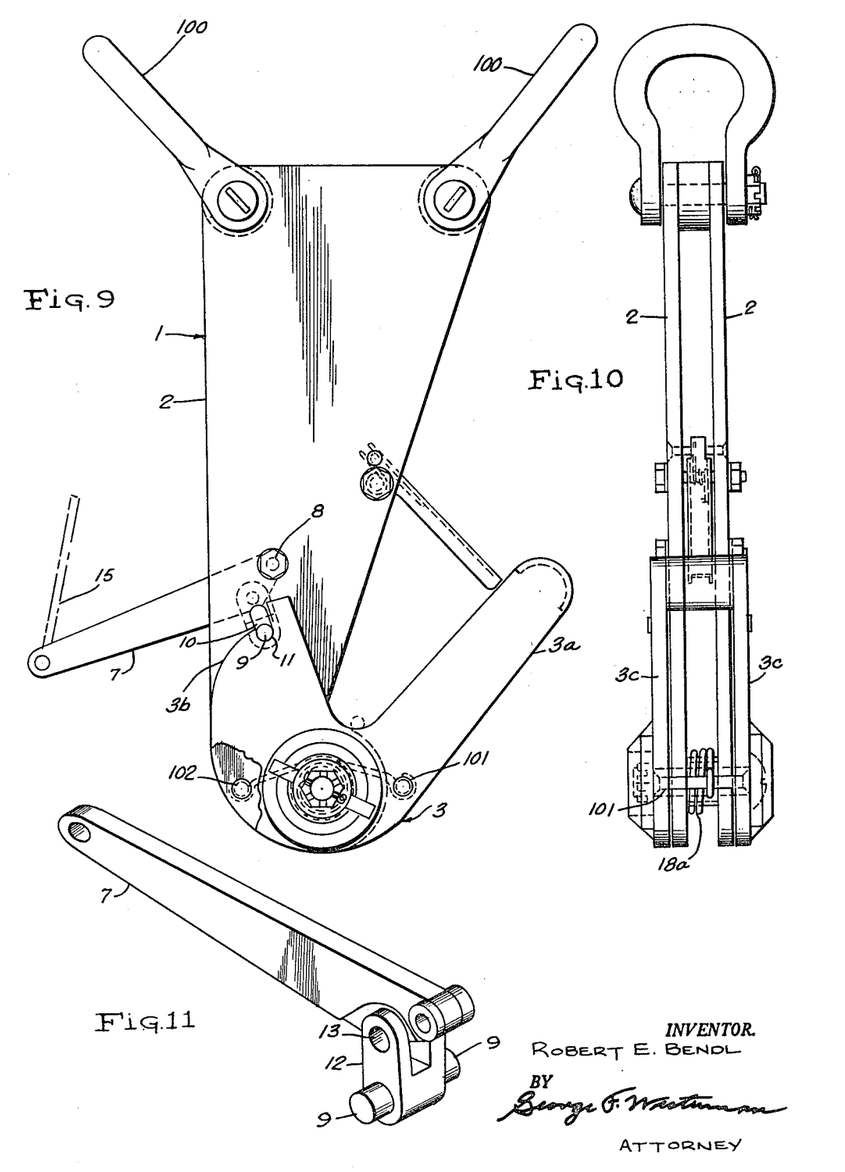
FIG. 9 is a side elevation of a modified form of helicopter cargo hook.
FIG. 10 is a front elevation of the hook shown in FIG. 9.
FIG. 11 shows part of the latching mechanism of the hook of FIG. 9 in an enlarged perspective view.

The helicopter cargo hook illustrated in FIGS. 9–11 is similar in many respects to that shown in FIGS. 1–8. The differences between the two hooks should be apparent from the drawings and from the following description. The hook of FIG. 9 has a tongue member shown generally at 3 composed of two joined tongue plates 3c which are pivotally mounted for simultaneous rotation exterior to shank plates 2. It has no shelf plates corresponding to those of the hook of FIG. 1. Although it has a somewhat different configuration, the latching lever 7 and associated latching mechanism is similar in construction and operation to that of FIG. 1. Torsion spring 18a anchored to tongue plates 3c by pin 101 and to shank plates 2 by pin 102 serves to return the tongue member to its closed position after the load is released as does spring 18 in FIG. 1. Clevises 100 are provided for use in attaching the hook to the helicopter.

Figures 12, 13:
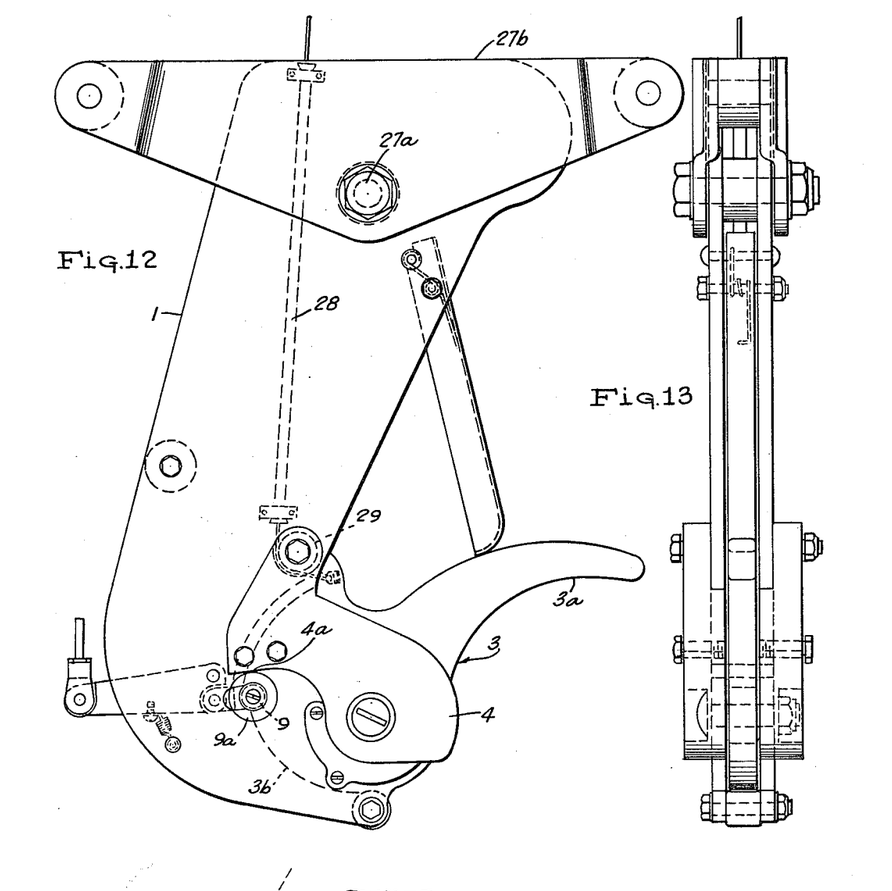
FIG. 12 is a side elevation of a further modification of a helicopter cargo hook.
FIG. 13 is a front elevation of the cargo hook shown in FIG. 12.
Figure 14:
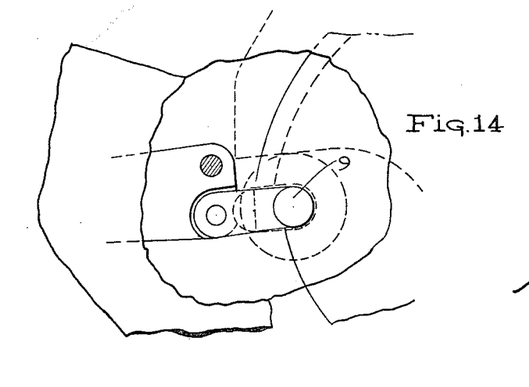
FIG. 14 is an enlarged view of part of the latching mechanism of the hook shown in FIG. 12.

The helicopter cargo hook illustrated in FIGS. 12–14 is likewise very similar to that shown in FIGS. 1–8. At its upper end the hook's shank 1 is connected by a single pivot 27a to a trapeze comprising a pair of beam plates 27b. The pivot 27a is located near the mid-length of the beam plates. There are holes at the ends of the beam plates through which sling cables may be passed for attachment to the helicopter. The ends of latching pin 9 are provided with antifriction bearings 9a which ride along surface 4a of shelf 4 and facilitate latching and unlatching. The hook is also provided with a recocking cable 28 which is connected to an upper portion of the tongue member 3, passes around sheave 29, mounted between shank plates 2, to a location within the pilot's compartment of the helicopter. After a load has been released the tongue member 3 may be restored to its load carrying position shown in FIG. 12 by pulling on recocking cable 28. The spring 18 of the cargo hook of FIG. 1 may be omitted when a hook is equipped with a recocking cable.

Figure 15:
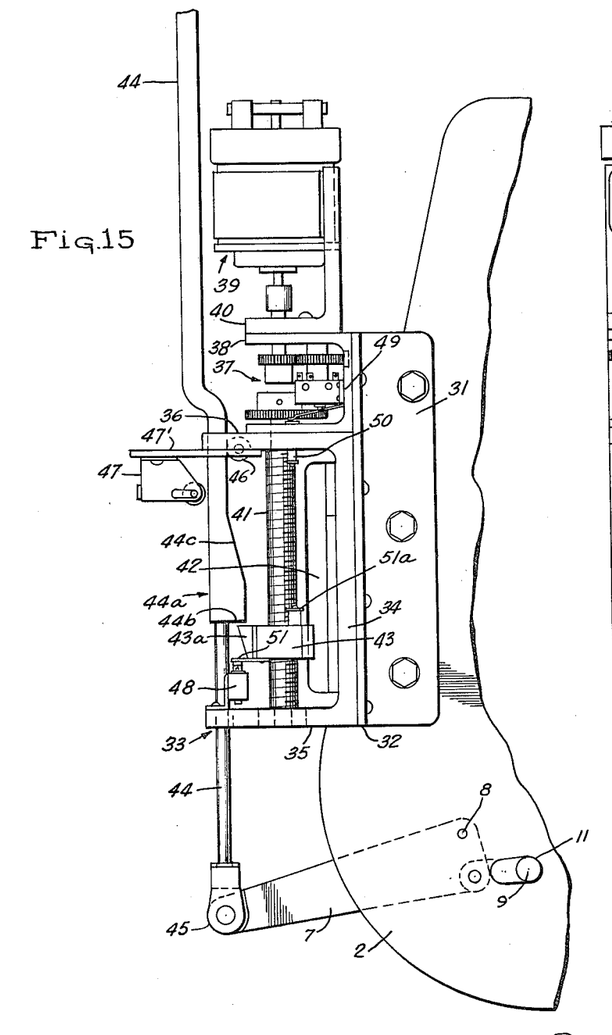
FIG. 15 is a side elevation of a motor driven release mechanism mounted on a helicopter cargo hook of the present invention.
Figure 16:
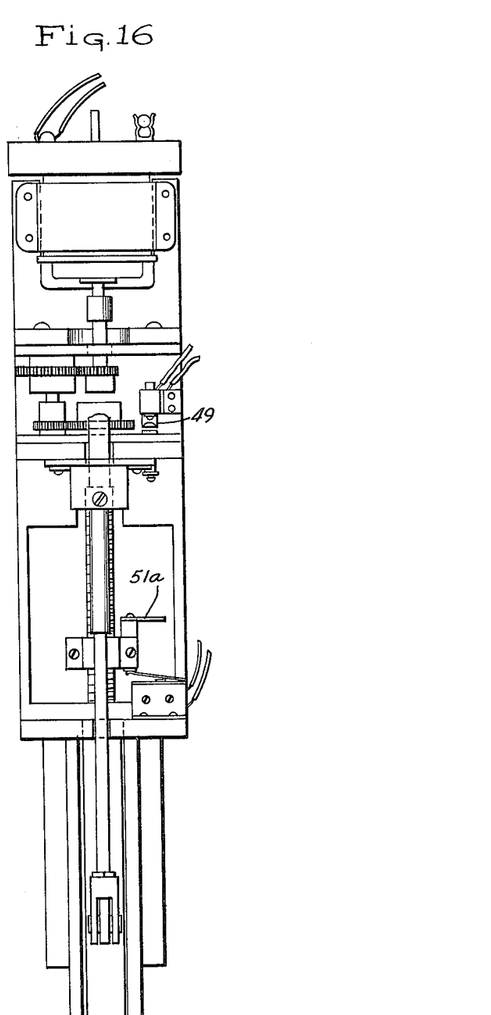
FIG. 16 is a rear elevation of the motor driven release mechanism and cargo hook shown in FIG. 15.

FIGS. 15 and 16 illustrate a preferred form of a motor driven release mechanism which, in response to a control switch closed by the pilot, automatically unlatches a helicopter cargo hook of the present invention releasing the load and thereafter automatically latches such hook and returns to its original condition. The release mechanism may be adapted for mounting on any of the modified forms of the helicopter cargo hook described herein.

The motor driven release mechanism 30 comprises a channel shaped bracket 31 which is bolted to the back edges of shank plates 2. To the cross member of bracket 31 is fastened plate 32. A mechanism frame generally indicated at 33 is mounted in its turn on plate 32 and comprises a base portion 34 and perpendicular end flanges 35 and 36. A speed reduction gear unit 37 is housed in gear frame 38 which is attached to end flange 36 and to plate 32. The speed reduction gear unit is driven by a fractional horsepower electric motor 39 whose supporting bracket 40 is secured to gear frame 38. The motor is reversible for a purpose which will appear presently. The motor through speed reduction gear unit 37 is coupled to screw shaft 41 which is journaled at its ends into end flanges 35 and 36. Thus the motor 39 can drive shaft 41 in either direction at a low speed. A guide bar 42 secured to the base portion 34 of the mechanism frame parallels screw shaft 41. Traveling nut 43 is threaded onto screw shaft 41 and has a slot by which it is keyed to guide bar 42. Thus the traveling nut is constrained to move longitudinally along screw shaft 41 when the shaft is rotated. A slide bar 44 extends slidably through aligned notches cut in the outer portions of end flanges 35 and 36 and is connected at one end to the outer end of latching lever 7 by adjustable connection 45. Thus when the slide bar is raised from the position shown in FIG. 15, latching lever 7 rotates about pivot pin 8 and latching pin 9 is withdrawn from latching notch 11 permitting the hook to open. Slide bar 44 is formed with a cam 44a located between end flanges 35 and 36; this cam has an abutment portion 44b and a ramp 44c. Traveling nut 43 has a sear formation 43a which engages abutment 44b and raises slide bar 44 when the traveling nut moves upward along screw shaft 41. A cam following roller 46 mounted at the inner end of the slide bar receiving notch in end flange 36 engages the inner side of slide bar 44. A motor reversing switch 47 is mounted on a hanger 47' which is slotted to receive slide bar 44; this switch is spaced a predetermined distance from the outer side of the slide bar for a purpose which will presently appear. A cutoff switch 48 is mounted on end flange 35. This switch is held in an open position by striker 51 on traveling nut 43 when the helicopter cargo hook is in a latched condition, i.e., when the nut 43 is at its bottommost position (as seen in FIG. 15).

The motor driven release mechanism just described may be wired in several different circuits to accomplish its function. For example, the circuitry may include, in addition to the items described above, a battery or source of current, a manual starting switch (not shown) in the pilot's compartment, a time delay relay and one or more electromagnetic relays (also not shown). When the manual starting switch is closed by the pilot, the time delay relay is closed thereby causing current to be furnished to motor 39 long enough for striker 51 to move away from cutoff switch 48. The time delay relay then automatically opens putting the manual switch out of the circuit. However, cutoff switch 48 is now closed and it can control the operation of motor 39. Of course, the time delay relay could be omitted. The pilot would then have to release the manual starting switch in the interval between the closing of switch 48 and the operation of reversing switch 47. As nut 43 continues upward, sear formation 43a contacts abutment 44b and raises slide bar 44. The upward movement of slide bar 44 retracts latching pin 9 from latching notch 11, the cargo hook is opened and the load released. As traveling nut 43 nears its topmost position, slide bar 44 is forced outwardly sufficiently so it operates reversing switch 47 which causes a reversal of the direction of rotation of motor 39. At the same time slide bar 44 has been pushed far enough outward that sear formation 43a no longer engages abutment 44b hence slide bar 44 is free to drop and the hook can relatch itself in a closed condition. It is immaterial if the operation of reversing switch 47 occurs before the slide bar is dropped provided the interval is fairly close since the inertia of the motor will carry nut 43 upward for a short time after the motor circuit is reversed. If desired a tension spring such as 14 in FIG. 1 may be used with latching lever 7 to facilitate the return of the latching mechanism to a latched condition.

After reversing switch 47 has been operated and slide bar 44 released, the rotation of screw shaft 41 is reversed and traveling nut 43 moves downward along the shaft. The shape of sear formation 43a enables the nut to slide past cam 44a. As the nut reaches its bottommost position, first striker 51 opens cutoff switch 48. The motor is then shut down and the nut will remain in its lower limiting position until the operating cycle is started again. Just before the nut has reached its bottommost position, slide bar 44 is forced outward by the action of sear formation 43a against cam 44a to a point where reversing switch 47 operates again. The inertia of the motor carries traveling nut 43 past cam 44a and into switch opening engagement with cutoff switch 48. Thus the entire circuit is returned to its original condition when the motor is cut off.

A cable (not shown) may be connected to the upper end of slide bar 48 for emergency manual unlatching of the cargo hook.

The motor driven release mechanism of FIGS. 15 and 16 is shown equipped with an alternate motor reversing switch 49 which may be used in lieu of motor reversing switch 47 to reverse the direction of the motor when nut 43 arrives at the top of its travel. Alternate reversing switch 49 is mounted on frame 38. It is closed by closing pin 50 which extends slidably through apertures in end flange 36 and frame 38. This closing pin 50 is actuated by second striker 51a carried by nut 43. The operation of the motor driven release mechanism thus modified will be fully explained in connection with the touchdown responsive release system described hereinafter. It should be understood that the reversing switches 47 and 49 are alternatives and that the release mechanism may be constructed with only one such switch.

Figure 17:
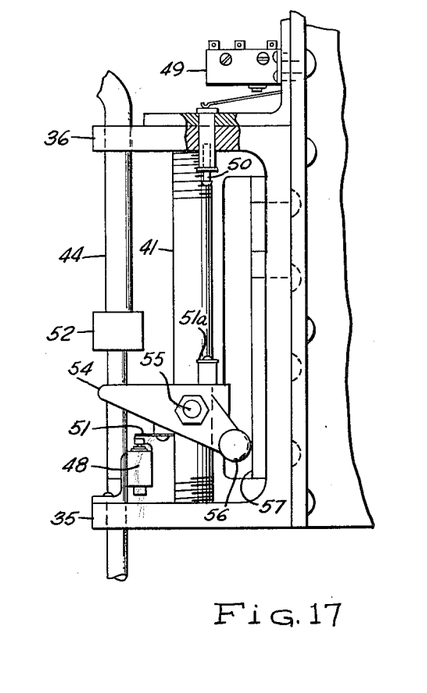
FIG. 17 is a side elevation of part of the motor driven release mechanism illustrated in FIG. 15 with certain modifications.
Figure 18:
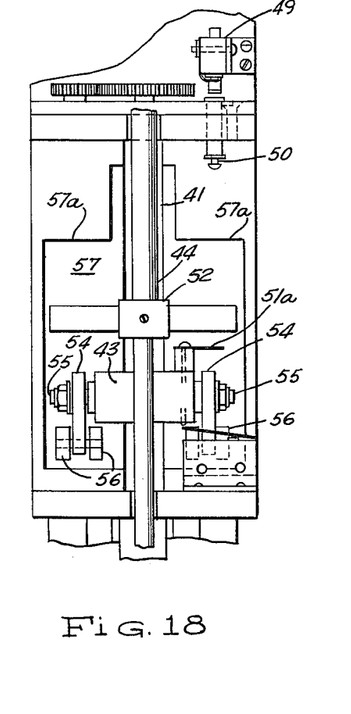
FIG. 18 is a back elevation of the mechanism shown in FIG. 17.

The motor driven release mechanism shown in FIGS. 17 and 18 is in most respects identical to that shown in FIGS. 15 and 16; the differences should be obvious from the drawings and the description which follows. Slide bar 44 is slidably received in apertures cut in end flanges 35 and 36. The slide bar is capable of up and down movement but not the outward movement of the corresponding slide bar in the release mechanism of FIGS. 15 and 16. A two-armed abutment 52 is mounted on slide bar 44 between end flanges 35 and 36. This abutment may be equipped with a set screw so that its position on slide bar 44 can be changed.

A trippable dog is mounted on traveling nut 43 and comprises a pair of spaced parallel levers 54 pivotally mounted on the nut by individual stud bolts 55. One end of levers 54 projects outward toward abutment 52. The other end has a pair of rollers 56 which ride on track 57. Torsion springs (not shown) rock levers 54 in a direction (counterclockwise as viewed in FIG. 17) to press rollers 56 against track 57. The release mechanism has a reversing switch 49 similar to the alternate reversing switch 49 of FIGS. 15 and 16 and a second striker 51a on traveling nut 43 to actuate reversing switch 49.

Traveling nut 43 is at its bottommost position when the cargo hook is latched. When the electric motor is started, rotation of screw shaft 41 causes traveling nut 43 to rise. Levers 54 push abutment 52, and with it slide bar 44, upward unlatching the helicopter cargo hook. The roller carrying portions of track 57 terminate at track end 57a short of the upper limit of travel of nut 43 so that when abutment 52 has been raised to a predetermined location rollers 56 ride off track end 57a and levers 54 rock against the force of the torsion springs and pass by abutment 52. When the traveling nut 43 reaches its upper limit of travel second striker 51a contacts sliding pin 50 actuating motor reversing switch 49 which reverses the motor circuit. The motor is reversed and the traveling nut 43 moves downward. Previously, when rollers 56 ran off the track end 57a, slide bar 44 was moved downward to its latching position by spring urged rotation of latching lever 7 (see FIG. 15). As nut 43 moves downward, levers 54 will rock to pass abutment 52 and will then return to the operative position below the abutment shown in FIG. 17. As the nut reaches its bottom limiting position, first striker 51 carried by traveling nut 43 actuates cutoff switch 48 shutting off the motor.

Figures 19, 20, 21:
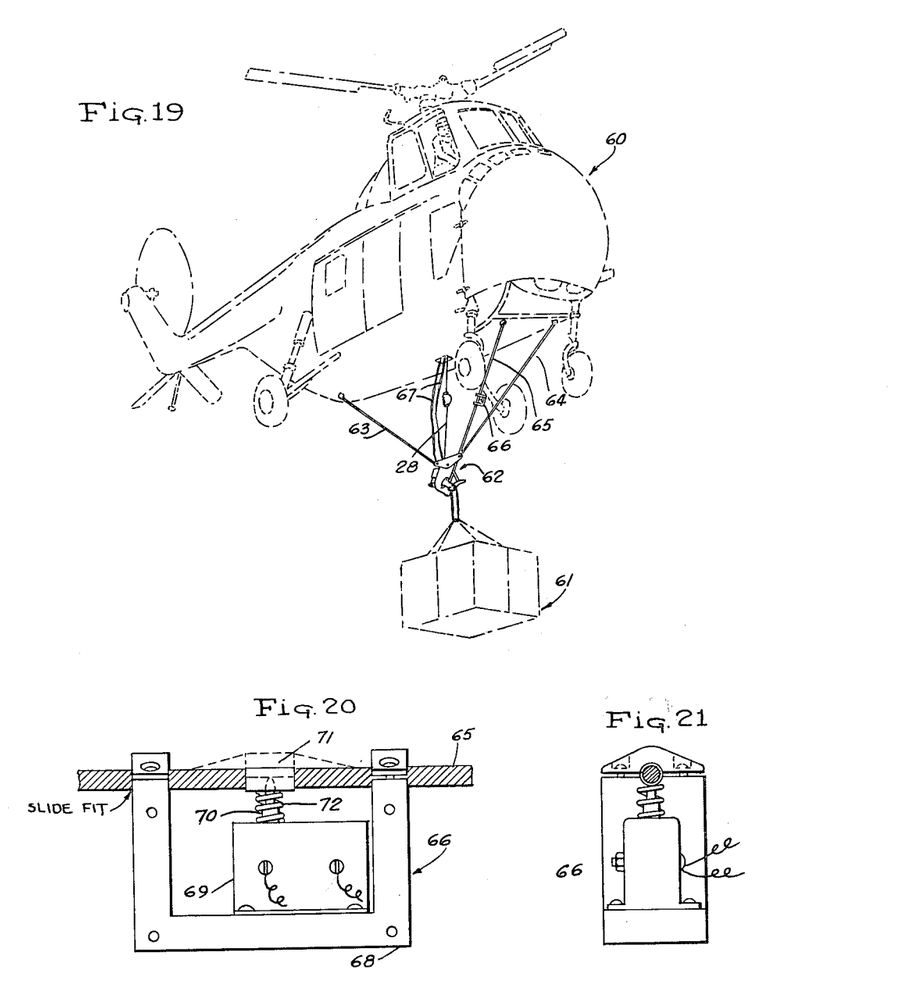
FIG. 19 is a perspective drawing of a helicopter carrying a load suspended by a system which includes a helicopter cargo hook of the present invention, equipped with a motor driven release mechanism, and a touchdown switch for automatically operating the release mechanism when the load contacts the ground.
FIG. 20 is a side elevation of the touchdown switch shown in FIG. 19.
FIG. 21 is an end elevation of the touchdown switch shown in FIG. 19.

Referring now to FIG. 19 which shows a helicopter carrying a load by means which include a touchdown release system, the helicopter is designated at 60, the load at 61. The cargo hook 62 by which the load is releasably connected to the helicopter is of the type shown in FIG. 12 equipped with the release mechanism of FIGS. 15 and 16 having the alternate motor reversing switch 49. The hook 62 is connected to the helicopter by three flexible cables 63, 64, and 65. The recocking cable 28 (see also FIG. 12) runs from the hook 62 to the pilot's compartment. Electrical connections to the release mechanism are designated at 67.

The touchdown mechanism 66 mounted on suspending cable 65 comprises a U-shaped frame 68 having the outer ends of its legs attached to cable 65. One of these legs is rigidly clamped to the cable and the other is lightly clamped so that the cable can slide through the latter leg. A touchdown switch 69 is mounted on the web portion of the frame and has an operating plunger 70 extending toward the cable. A sleeve 71 surrounding and secured to cable 65 engages the outer end of plunger 70 and maintains the touchrown switch 69 in circuit opening condition as long as the cable is taut, i.e. as long as hook 62 is supporting load 61. A compression spring 72 surrounds plunger 70 between the body of the switch and cable sleeve 71 and urges cable 65 away from the body of the switch when the cable is slack thereby permitting the touchdown switch to assume its circuit closing position. Thus, when the suspended load is touched down on the ground, load carrying cables 63, 64, and 65 are slackened and touchdown switch 69 closes. The switch may be enclosed in a dust and moisture proof housing of conventional construction.

Figure 22:
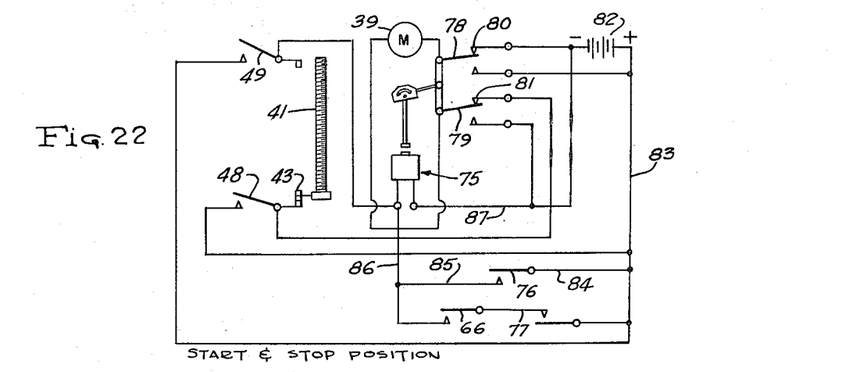
FIGS. 22, 23, and 24 show a suitable circuit for the touchdown release system illustrated in FIG. 20.
Figure 23:
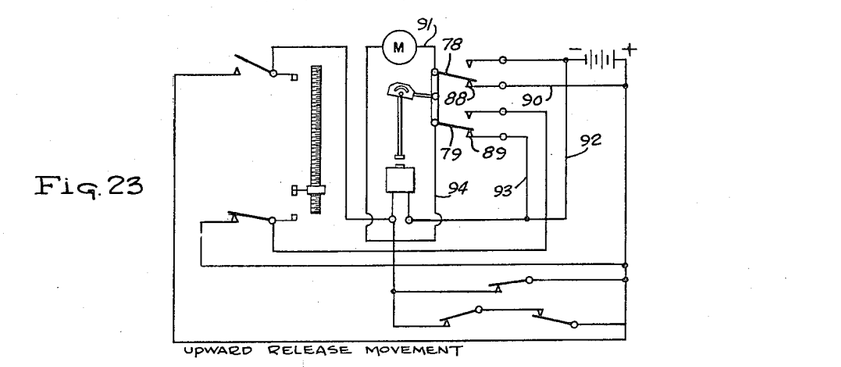
Figure 24:
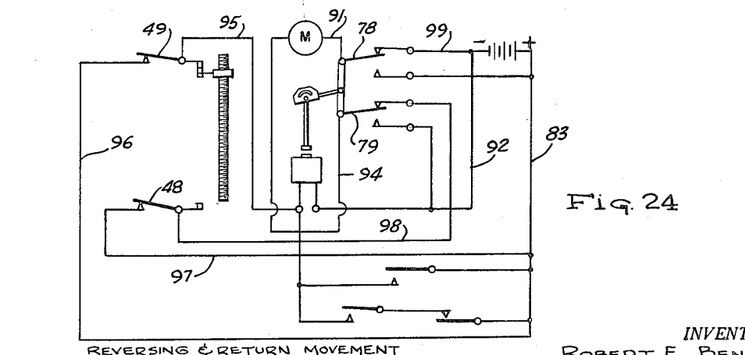

A suitable operating circuit for the touchdown release system illustrated in FIG. 19 is shown in FIGS. 22, 23, and 24. This circuit includes an electromagnetic relay 75 which is mounted in the helicopter and connected by separate conductors to the motor 39 of the release mechanism, to cutoff switch 48, to reversing switch 49, and to certain operating bswitches which will be described hereafter. This relay is of the "flip flop" type which assumes a predetermined position when its electromagnet is energized and remains in that position until the magnet is again energized; when the magnet is re-energized the relay assumes its alternate position. The alternate positions of the relay are diagrammatically illustrated in FIGS. 22 and 23.

Manual switch 76 is located in the cockpit of the helicopter for operation by the pilot in emergencies or when he does not wish to use automatic touchdown release procedures. This switch 76 would normally be mounted on the control stick of the helicopter and should be of the "trigger" type which is momentarily closed when operated and then opened and cannot be closed again until the trigger is released and reactuated. The touchdown switch 66 previously described is shown in series with an arming switch 77, the two switches being in parallel with manual switch 76.

FIG. 22 shows the condition of the circuit when the cargo hook 62 is in load carrying condition. Traveling nut 43 is at its bottommost position on screw shaft 41 and holds cutoff switch 48 open. Reversing switch 49 is likewise open. Movable switch arms 78 and 79 of relay 75 engage contacts 80 and 81 respectively. A source of power 82 such as a storage battery is connected into the circuit.

Assuming now that the pilot wishes to open the hook by using manual switch 76 when he presses the trigger, a circuit is completed from the positive side of battery 82 through conductors 83 and 84, switch 76, conductors 85 and 86, relay magnet 75, and conductor 87 to the negative side of the battery. The relay magnet is thus energized and switch arms 78 and 79 assume the positions shown in FIG. 23 engaging contacts 88 and 89 respectively. The positive side of battery 82 is now connected to the right hand side of motor 39 by conductor 90, switch arm 78 and conductor 91 while the left hand side of the motor is connected to the negative side of the battery through conductors 92 and 93, switch arm 79 and conductor 94. When this circuit is completed, the motor rotates screw shaft 41 and raises nut 43, as indicated in FIG. 23.

If, instead of using manual switch 76 to release the cargo, the pilot wishes to have the cargo automatically released when it touches the ground, he closes touchdown arming switch 77 any time before the touchdown and does not use trigger switch 76. With arming switch 77 closed, as soon as the cargo is grounded, touchdown switch 66 closes thereby initiating the sequence described in the preceding paragraph and the hook will be automatically opened to release the cargo.

When traveling nut 43 has left its lowest position, cutoff switch 48 closes mechanically, as shown in FIG. 23; when the nut reaches its topmost position, coincidental with full release of the cargo hook, nut 43 mechanically closes reversing switch 49. Thus, when the cargo has been released both switches 48 and 49 are closed, as shown in FIG. 24. Before nut 43 closes reversing switch 49, however, arming switch 77 must be opened so that relay 75 is de-energized. This may be done manually by the pilot. After the cargo has been released, the motor 39 must be reversed to return nut 43 to its lower cutoff position. For this purpose relay 75 is re-energized by the closing of reversing switch 49. One side of the relay magnet is now connected through conductor 95, reversing switch 49 and conductors 96 and 83 to the positive side of the battery 82. The other side of the relay magnet is connected through conductor 92 to the negative side of the battery. When the relay is thus re-energized, it changes its position from that illustrated in FIG. 23 to that shown in FIG. 24. The left side of the motor is connected to the positive side of the battery through conductor 94, switch arm 79, conductor 98, cutoff switch 48, and conductors 97 and 83. The negative side of the battery is connected through conductor 99, switch arm 78 and conductor 91 to the right hand side of the motor. The connections between the battery and motor are thus reversed so that the motor returns nut 43 toward the lower limiting position shown in FIG. 22. After nut 43 begins its downward travel, reversing switch 49 opens mechanically and when nut 43 reaches its lower limiting position, the nut mechanically opens cutoff switch 48, thereby stopping the motor and leaving the circuit in the condition shown in FIG. 22. Touchdown switch 66 is reopened when a new load is attached to the helicopter.

The several embodiments of the helicopter cargo hook, motor driven release mechanism, and release system shown and described herein are illustrative only and may be departed from in many respects without departing from the scope of the invention.

I claim:

1. A helicopter cargo hook comprising a normally vertical shank, a tongue member rotatably mounted at the lower end of said shank and having a tongue portion, a latching notch and a curved surface, said tongue member being rotatable between a closed position in which said tongue and said shank constitute a load supporting hook and an open position in which the tongue depends from the shank at an angle greater than 90°, a latching pin movably mounted on said shank and receivable in said latching notch to releasably secure said tongue in its closed position, latching means connected to said pin for moving said pin into and out of said latching notch and comprising a lever pivotally mounted on said shank, a link connecting said lever to said latching pin; and motor driven release mechanism carried by said shank and connected to said lever and comprising a reversible electric motor, a screw shaft drivably connected to said motor, a slide bar coupled to said latching lever and mounted for sliding movement including motion parallel to the axis of said screw shaft, a travelling nut mounted for longitudinal movement along said screw shaft between a first limiting position at which it contacts a cutoff switch and a second limiting position at which it contacts a reversing switch, said slide bar and travelling nut co-acting so that while the travelling nut moves from its first limiting position to its second limiting position it first engages the slide bar thereby causing the aforesaid tongue member to be unlatched and then releases the slide bar thereby permitting the tongue member to be relatched.

2. A system comprising the helicopter cargo hook and motor driven release mechanism described in claim 1 and having in additional combination therewith a source of electric current; starting means for starting the said electric motor; reversing means responsive to contact by the said traveling nut with said reversing switch for reversing the rotation of said motor, cutoff means responsive to contact by said traveling nut with said cutoff switch for stopping said motor.

3. A touchdown release system comprising the system described in claim 2, having in additional combination therewith a plurality of cables by which the cargo hook is suspended from the helicopter, and wherein the starting means comprises a touchdown-actuated mechanism attached to one of said cables, the said touchdown-actuated mechanism comprising a two-legged frame, one leg affixed to said cable, the other leg slidably attached to said cable, a plunger actuated electric switch, the body of said switch being mounted on said frame, the distal end of said plunger bearing against said cable, whereby said switch is held in circuit opening condition when said cable is taut and said switch is placed in circuit closing condition when said cable is slackened.

4. An open throat cargo hook assembly for suspending an air transportable cargo package from an aircraft comprising a frame having an upper and lower end and including a pair of flat plates secured together in superposed spaced apart relationship, a pivotal mounting extending through said plates near the lower end of said frame, a hook beam rockably mounted on said pivotal mounting and having a beak portion extending from one side of said pivotal mounting beyond the corresponding edge of said frame and a latch portion at the other side of said pivotal mounting, said latch portion having an acurate edge portion and a latching notch at one end of said arcuate portion, said plates having registering closed slots therein adjacent to the arcuate edge portion of said hook beam, a latching pin extending through said slots transversely of said frame and engageable in said notch to lock said hook beam in load supporting position in shear of said pin, a lever disposed between said frame plates and extending at one end beyond the edge of said frame opposite said hook beak, a pivot pin extending through said frame plates and said lever near the other end of said lever, link means connecting said other end of said lever to said latching pin for removal of said pin from said notch upon movement of said lever in one direction, means connected to said one end of said lever to move said lever in said one direction, resilient means connected between said frame and said lever urging said lever in the opposite direction to urge said latching pin into said notch, resilient means connected between said frame and said hook beam urging said hook beam from its load releasing to its load supporting position, and means connected to the upper end of said frame for securing said hook assembly to an associated aircraft.

5. The arrangement set forth in claim 4, including lineally acting power actuated means carried by said frame and connected to said lever to move said lever in a direction to move said pin out of said notch.

6. The arrangement set forth in claim 4, including roller bearings on said pin bearing against pin guiding surfaces of said frame to reduce frictional resistance to movement of said pin into and out of said notch, and lineally acting power actuated means carried by said frame and connected to said lever to move said lever in a direction to move said pin out of said notch.

7. The arrangement set forth in claim 4 wherein said suspension means comprises a trapeze including a pair of elongated flat plates disposed in superposed relationship at the respectively opposite sides of the upper end portion of said frame, a pivotal mounting extending through said trapeze and frame plates adjacent the mid-length location of said trapeze plates, and clevises secured to said trapeze at the opposite ends thereof connecting the cables of a cargo sling to said trapeze whereby said hook assembly is suspended by a single pivotal connection.

8. An open throat hook assembly for suspending an air transportable cargo package from an associated aircraft comprising an elongated frame normally having an upper end and a lower end and including a pair of flat plates secured in spaced apart superposed relationship, a pivotal mounting extending through said frame adjacent to the lower end thereof, a hook beam mounted on said pivotal mounting and projecting at one end outwardly of the adjacent edge of said frame, said hook beam being angularly movable between load supporting and load releasing positions, resilient means acting between said frame and said hook beam to urge said hook beam to its load supporting position, latching means carried by said frame and engageable with said hook beam at the side of said pivotal connection opposite the outwardly projecting end of said hook beam for latching said hook beam in load supporting position, selectively controllable release means connected to said latching means to release said latching means and free said hook beam for movement from its load supporting to its load releasing position, and suspension means connected to the upper end of said frame for suspending said hook assembly from an associated aircraft, said latching means comprising an arcuately curved formation on said hook beam at the side of said pivotal connection opposite the extending end of said hook beam, said formation having a pin receiving notch therein, a pin disposed in registering slots in said frame plates and engageable at its intermediate portion in said notch when said hook beam is in its load supporting position, a lever pivotally mounted on said frame adjacent said pin and projecting at one end beyond the adjacent edge of said frame, and means connecting said lever to said pin to move said pin out of said notch when said lever is moved in a predetermined direction about its pivotal mounting on said frame.

9. An open throat cargo hook assembly for suspending an air transportable package from an aircraft and releasing the cargo package either at command or upon touch down of the package comprising a frame having a normally upper end connected to the aircraft by a suitable sling and a lower end, a hook beam rockably mounted on said frame at the lower end thereof for angular movements between load supporting position and load releasing positions, said hook beam having a notch therein and said frame having a slot overlapping said notch when said hook beam is in load supporting position, a pin in said slot extending transversely through said frame and engageable in said notch to lock said hook beam in load supporting position, a lever pivotally mounted on said frame and connected to said pin to move said pin along said slot and out of said notch when said lever is rocked in a predetermined direction, an electrically actuated device mounted on said frame and connected to said lever to move said lever in said predetermined direction when said device is energized, a command switch in a location accessible to the aircraft pilot for directly energizing said device, an arming switch mounted in convenient access to the aircraft pilot and effective when closed to condition said device for energization upon touch down of the cargo package, and a touch down switch mounted on the hook supporting sling and effective to energize said device upon touch down of the cargo package when said arming switch is closed.

10. A motor driven latch operating mechanism comprising a latching device; resilient means urging said latching device into its latched condition; a reversible electric motor, a screw shaft drivably connected to said motor; a slide bar coupled to said latching device and mounted for sliding movement including motion parallel to the axis of said screw shaft; a traveling nut mounted for longitudinal movement along said screw shaft between a first limiting position and a second limiting position; said slide bar and said traveling nut coacting so that while the traveling nut moves from its first limiting position to its second limiting position it first engages the slide bar thereby causing the latching device to be unlatched and then releases the slide bar thereby permitting the latching device to be relatched.

References Cited in the file of this patent
UNITED STATES PATENTS

| | | |
|---|---|---|
| 902,096 | Love | Oct. 27, 1908 |
| 1,333,511 | Small | Mar. 9, 1920 |
| 1,368,647 | Myers | Feb. 15, 1921 |
| 1,559,713 | Lester | Nov. 3, 1925 |
| 2,537,185 | Evans | Jan. 9, 1951 |
| 2,702,482 | Divette | Feb. 22, 1955 |
| 2,873,995 | Turner | Feb. 17, 1959 |
| 2,904,369 | Campbell | Sept. 15, 1959 |

FOREIGN PATENTS

| | | |
|---|---|---|
| 116,115 | Great Britain | June 6, 1918 |
| 839,629 | Great Britain | of 1960 |
| 543,527 | Canada | July 16, 1957 |